(12) United States Patent
Zhang et al.

(10) Patent No.: US 10,611,038 B2
(45) Date of Patent: Apr. 7, 2020

(54) CABLE-MANAGEMENT SYSTEM, A ROTARY JOINT AND A ROBOT

(71) Applicant: ABB Schweiz AG, Baden (CH)

(72) Inventors: Shimin Zhang, Shanghai (CN); Kangjian Wang, Shangahi (CN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/598,872

(22) Filed: May 18, 2017

(65) Prior Publication Data

US 2017/0252931 A1     Sep. 7, 2017

Related U.S. Application Data

(63) Continuation of application No. PCT/CN2014/091699, filed on Nov. 19, 2014.

(51) Int. Cl.
*B25J 19/00*     (2006.01)
*B25J 17/02*     (2006.01)
(Continued)

(52) U.S. Cl.
CPC .......... *B25J 19/0025* (2013.01); *B25J 17/00* (2013.01); *B25J 17/02* (2013.01); *B25J 17/0241* (2013.01);
(Continued)

(58) Field of Classification Search
CPC ... B25J 9/126; B25J 17/00; B25J 17/02; B25J 17/0241; B25J 19/0025; B25J 19/0029; B25J 19/0041
(Continued)

(56) References Cited

U.S. PATENT DOCUMENTS

| 5,742,982 A | * | 4/1998 | Dodd | ............ F16G 11/00 24/16 R |
| 6,153,828 A | * | 11/2000 | Murata | ............ B25J 19/0029 174/50 |

(Continued)

FOREIGN PATENT DOCUMENTS

| CN | 1660546 A | 8/2005 |
| CN | 102112275 A | 6/2011 |

(Continued)

OTHER PUBLICATIONS

State Intellectual Property Office of P.R. China, International Search Report & Written Opinion issued in corresponding Application No. PCT/CN2014/091699, dated Sep. 2, 2015, 9 pp.

(Continued)

*Primary Examiner* — Victor L MacArthur
*Assistant Examiner* — Joseph Brown
(74) *Attorney, Agent, or Firm* — Taft Stettinius & Hollister LLP; J. Bruce Schelkopf

(57) ABSTRACT

A cable-management system includes an outer group of cables and an inner group of cables, a first cable guide, a second cable guide and at least four fixing members, wherein the first cable guide has a circular tube-shaped space, and the outer group of cables is partly accommodated between the first cable guide and the second cable guide; the second cable guide has a circular tube-shaped, and the inner group of cables is partly accommodated between the second cable guide and the first rotary shaft portion; and the fixing members respectively secure both ends of the outer group of cables or the inner group of cables on and along the first and second rotary shaft portions in a form in which the cables are arranged in parallel with each other.

16 Claims, 9 Drawing Sheets

(51) Int. Cl.
 *B25J 17/00* (2006.01)
 *B25J 9/12* (2006.01)

(52) U.S. Cl.
 CPC ....... *B25J 19/0029* (2013.01); *B25J 19/0041* (2013.01); *B25J 9/126* (2013.01); *Y10S 901/28* (2013.01)

(58) Field of Classification Search
 USPC ............... 74/490.01, 490.02, 490.05, 490.06
 See application file for complete search history.

(56) References Cited

U.S. PATENT DOCUMENTS

| | | | | |
|---|---|---|---|---|
| 7,299,713 | B2* | 11/2007 | Uematsu | B25J 19/0029 74/490.02 |
| 7,559,590 | B1* | 7/2009 | Jones | B25J 19/0025 901/29 |
| 8,584,547 | B2 | 11/2013 | Sirkett et al. | |
| 9,142,946 | B2* | 9/2015 | Krager | H02G 3/32 |
| 9,796,097 | B2* | 10/2017 | Kirihara | B25J 17/02 |
| 2005/0189333 | A1 | 9/2005 | Nakagiri et al. | |
| 2010/0313694 | A1* | 12/2010 | Aoki | B25J 19/0029 74/490.02 |
| 2017/0197319 | A1* | 7/2017 | Cao | B25J 19/0029 |

FOREIGN PATENT DOCUMENTS

| | | |
|---|---|---|
| CN | 103707287 | 4/2017 |
| JP | 2001310289 A * | 11/2001 |
| JP | 2001310289 A | 11/2001 |
| JP | 2003117878 A | 4/2003 |
| JP | 2004090135 A | 3/2004 |
| JP | 4680700 B2 | 5/2011 |
| JP | 2014097573 A | 5/2014 |

OTHER PUBLICATIONS

Extended European Search Report, European Patent Application No. 14906553.4, dated Oct. 9, 2018, 10 pages.
Chinese Office Action, Chinese Patent Application No. 201480081917.7, dated Jun. 21, 2018, 6 pages including machine translation in English.
Chinese Search Report, Chinese Patent Application No. 201480081917.7, dated Jun. 21, 2018, 4 pages including machine translation in English.

* cited by examiner

CABLE-MANAGEMENT SYSTEM, A ROTARY JOINT AND A ROBOT

FIELD OF THE INVENTION

Embodiments of the present disclosure generally relate to a cable-management system, and particularly relate to a cable-management system for use in a rotary joint, and a robot comprising the rotary joint.

BACKGROUND OF THE INVENTION

A robot having an articulated arm generally includes motors and joints. The motors are located at the axes of the respective joints to actuate the joints. Such a robot is controlled by a controller with the supply of electric power to the motors. Therefore, the controller and the robot are connected via cables. Generally, such cables are bundled up. Also, such cables are usually accommodated inside the robot and connected to respective parts from the inside, in order to save space or avoid the cables per se from becoming a hindrance. Due to the ever-increasing complexity of robotic systems, careful planning with regard to cable positioning and accommodation of joint movement is required as robotic cells are designed.

In particular, cables passing through moving joints must accommodate the various mechanical displacements without excessive mechanical wear due; these displacements may alter the bending load of the cables and/or changes in their diameters due to twisting (or torsion) of the joints. For example, cables passing through robotic joints ideally have a large and uniform bend radius to minimize cable deformation and homogeneously distribute the bending load thereon. The large and uniform bend radius, however, may be difficult to achieve in a space-constrained package of the robotic system (e.g., the joints).

For a conventional structure, as shown in FIG. 1, cables are fixed in a U-shaped and flat form. This cable management system may prevent friction between each of the cables and each of the members that produce rotation. But the working range of its rotary shaft is limited within ±170 degrees.

However, due to the ever-increasing working range, it is required for servo motor and gearbox to rotate over ±170 degrees, even up to ±290 degrees. The known cable harness does not satisfy this need. For example, it is difficult for a joint with cables that transmit signals or power, and for air hoses to rotate over ±170 degrees, even up to ±290 degrees accordingly.

For this reason, there is a need in the art to develop an improved cable-management system.

SUMMARY OF THE INVENTION

The object of the present invention is to provide a novel cable-management system for holding cables in arms of an articulated type of robot, and in particular, to the system that holds the cables bridging a fixed part and a rotary part in the arms.

According to one aspect of the invention, there is provided a cable-management system. The system holds a plurality of cables arranged in a rotary joint connected to an articulated arm having rotary shaft portions which allow the arm to rotate on the axis given thereto, each of the rotary shaft portions being divided into two shaft portions, a first of which is fixed and a second of which is rotatable, the system facilitating rotation from a first angular position to a second angular position without damage to the cables. The cables are divided into the outer group of cables and the inner group of cables; and the system comprises a first cable guide, a second cable guide and at least four fixing members, wherein the first cable guide has a circular tube-shaped space, and the outer group of cables is partly accommodated between the first cable guide and the second cable guide; the second cable guide has a circular tube-shaped, and the inner group of cables is partly accommodated between the second cable guide and the first rotary shaft portion; and the fixing members respectively secure both ends of the outer group of cables or the inner group of cables on and along the first and second rotary shaft portions in a form in which the cables are arranged in parallel with each other, so that remaining portions of the outer group of cables or the inner group of cables are bent and suspended along the first and second rotary shaft portions in a U-shaped.

According to a preferred embodiment of the present invention, the range of clockwise and counterclockwise rotation of the second rotary shaft portion is about ±290 degrees.

According to a preferred embodiment of the present invention, the first cable guide comprises a first static guide and a first moving guide, therein the first static guide is fixedly arranged along the first rotary shaft portion, and the first moving guide is fixedly arranged along the second rotary shaft portion so as to rotate together with the second rotary shaft portion.

According to a preferred embodiment of the present invention, the first static guide is structured by two pieces of half circular-shaped plastic cover, and the first moving guide is structured by two pieces of half circular-shaped plastic cover.

According to a preferred embodiment of the present invention, the second cable guide comprises a second static guide and a second moving guide, therein the second static guide is fixedly arranged along the first rotary shaft portion, and the second moving guide is fixedly arranged along the second rotary shaft portion so as to rotate together with the second rotary shaft portion.

According to a preferred embodiment of the present invention, the second static guide is structured by a half circular-shaped plastic cover and a half circular-shaped plastic cover, and the second moving guide is structured by a half circular-shaped plastic cover and a half circular-shaped plastic cover.

According to a preferred embodiment of the present invention, the fixing member comprises a sheet metal part which has two ends for holding the cables, an elastic part for positioning the cables, and a plurality of screws, which are configured to connect two ends of the sheet metal part, connect the sheet metal part to the rotary shaft portion, respectively.

According to a preferred embodiment of the present invention, the fixing member further comprises an adapter part for adjusting the angle of the fixing member according to the rotary shaft portion.

According to a preferred embodiment of the present invention, the screws for use to connect the sheet metal part to the rotary shaft portion are structured to first connect the sheet metal part to the adapter part, then connect the adapter part to the rotary shaft portion.

According to a preferred embodiment of the present invention, one adapter part is formed to connect one or several sheet metal parts.

According to a preferred embodiment of the present invention, the elastic part has independent holes for each cable.

According to a preferred embodiment of the present invention, the diameter of the cables is the same or different.

According to a preferred embodiment of the present invention, the outer group of cables or the inner group of cables are structured in one layer form or a multi-layer form.

According to a preferred embodiment of the present invention, the outer group of cables or the inner group of cables are a group of cables, or the combination of an air hose and a group of cables.

According to another aspect of the invention, there is provided a rotary joint comprising the cable-management system as described above.

According to another aspect of the invention, there is provided a robot comprising the rotary joint as described above.

According to a preferred embodiment of the present invention, the robot has a controller and a plurality of articulated arms respectively provided with electric motors to drive the arms, the cables electrically connecting the controller and the motors.

Compared with the existing prior arts, the solution for cable management can achieve several advantages as below.

Wide work range: the present invention can expand the working range of rotary shafts of the robots, and make the robots more agile.

Long lifetime: the present invention can extend the lifetime of cable harness in the rotary shaft.

Good layout: the present invention can save space, hide the cable harness inside the covers, and make the robot more aesthetical profile and more competitive.

Other features and advantages of embodiments of the present application will also be understood from the following description of specific exemplary embodiments when read in conjunction with the accompanying drawings, which illustrate, by way of example, the principles of the invention.

BRIEF DESCRIPTION OF THE DRAWINGS

The above and other features of the present disclosure will become more apparent through detailed explanation on the embodiments as illustrated in the description with reference to the accompanying drawings, throughout which like reference numbers represent same or similar components and wherein.

Throughout the figures, same or similar reference numbers indicate same or similar elements.

DETAILED DESCRIPTION OF PREFERRED EMBODIMENTS

Figure 1:
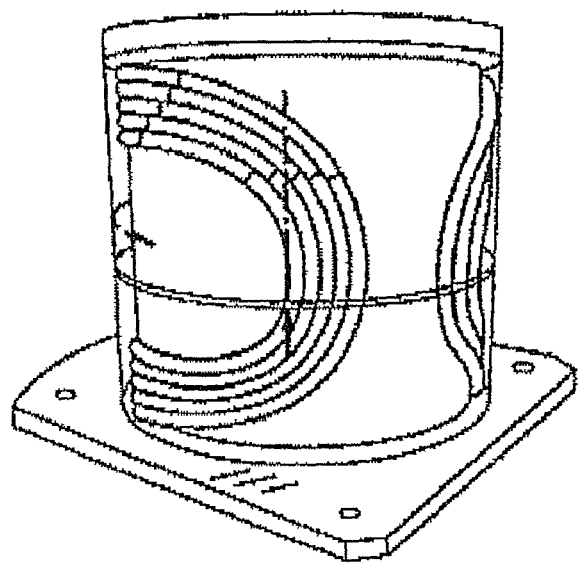
FIG. 1 shows a conventional structure of cable harness in the rotary joint.

Hereinafter, solutions as provided the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

Generally, all terms used in the claims are to be interpreted according to their ordinary meaning in the technical field, unless explicitly defined otherwise herein. All references to "a/an/the/said [element, device, component, means, step, etc]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

In general, embodiments of the present application provide a new cable-management system for a robot. As will be apparent from the further discussions below, double-layer cable layout and fixing members are employed to provide a cable-management system.

A robotic system generally includes various electromechanical systems connected by cables. Cables are available to transfer power or signal. An air hose is typically available to transfer fluid, for example, air.

Throughout the descriptions of various embodiments of the present application, repeated descriptions of some similar elements will be omitted.

Next, reference will be made to describe an example of the cable-management system in the rotary joint of a robot in which the first embodiment of the present disclosure can be implemented. A portion of a robotic system having multiple types of rotary joints. The robot has a controller and a plurality of articulated arms respectively provided with electric motors to drive the arms, the cables electrically connecting the controller and the motors (an example of a robot 71 having a controller 72 and a plurality of articulated arms 73 respectively provided with joints 100). Each joint may have different characteristics, freedom of movement (e.g., range of motion or degrees of freedom), and/or package space; therefore, cable-management systems passing through the joints generally require special designs adapted to the particular joint type. For example, cables require a large bending stiffness, or a large twisting deformation. In accordance with embodiments of the present invention, the same basic configuration may be applied to common joints, to make the rotary joints to work over wide range, such as up to ±290 degrees. However, the way in which cables are folded to enter and/or exit the cable-management system may be modified to conform to the various packaging spaces of different joint types. This may avoid damaging the cables and thus maximizes their lifetime.

Figure 2:
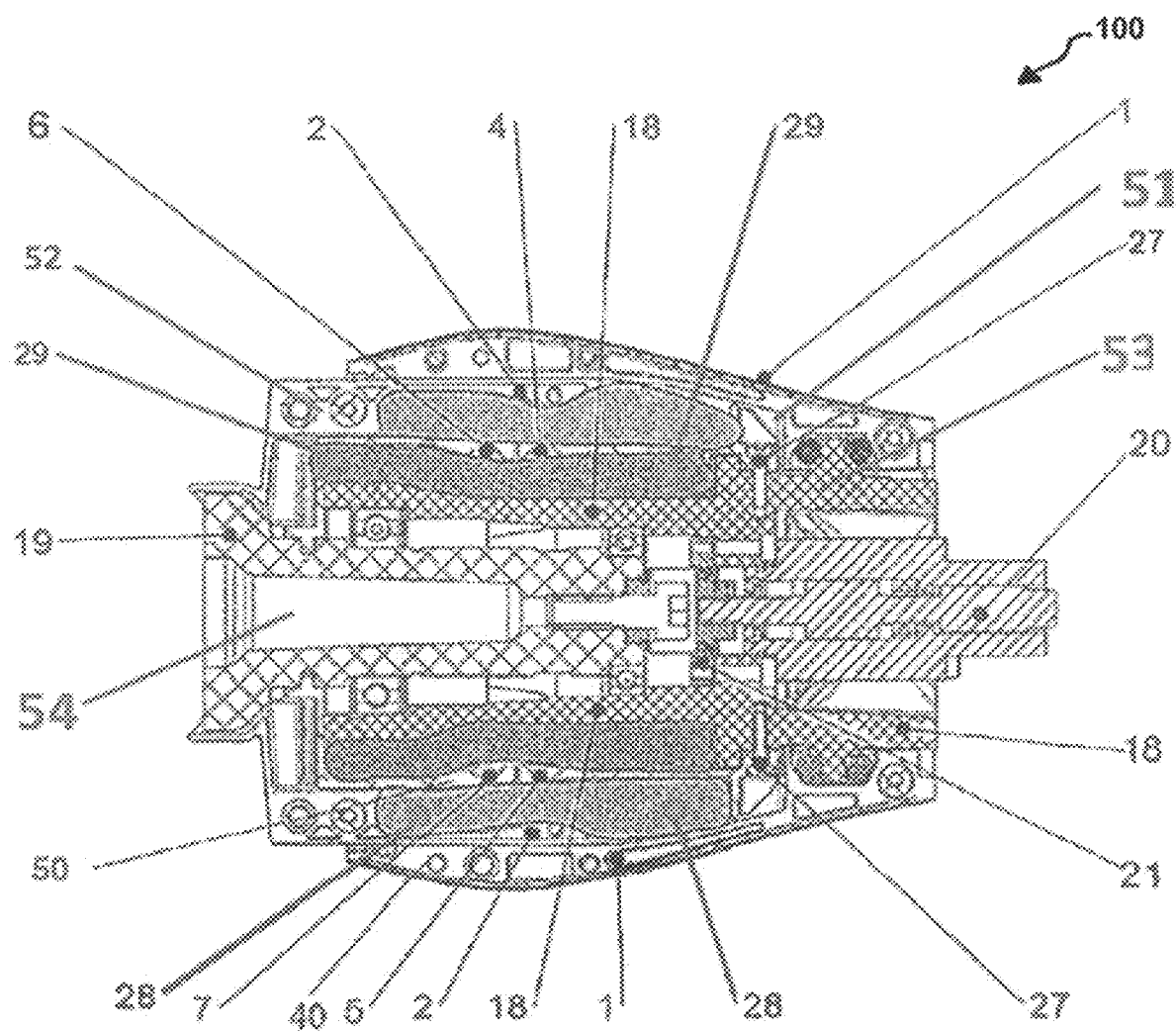
FIG. 2 shows a section view of the double-layer cable layout according to an embodiment of the present disclosure.
Figure 3:
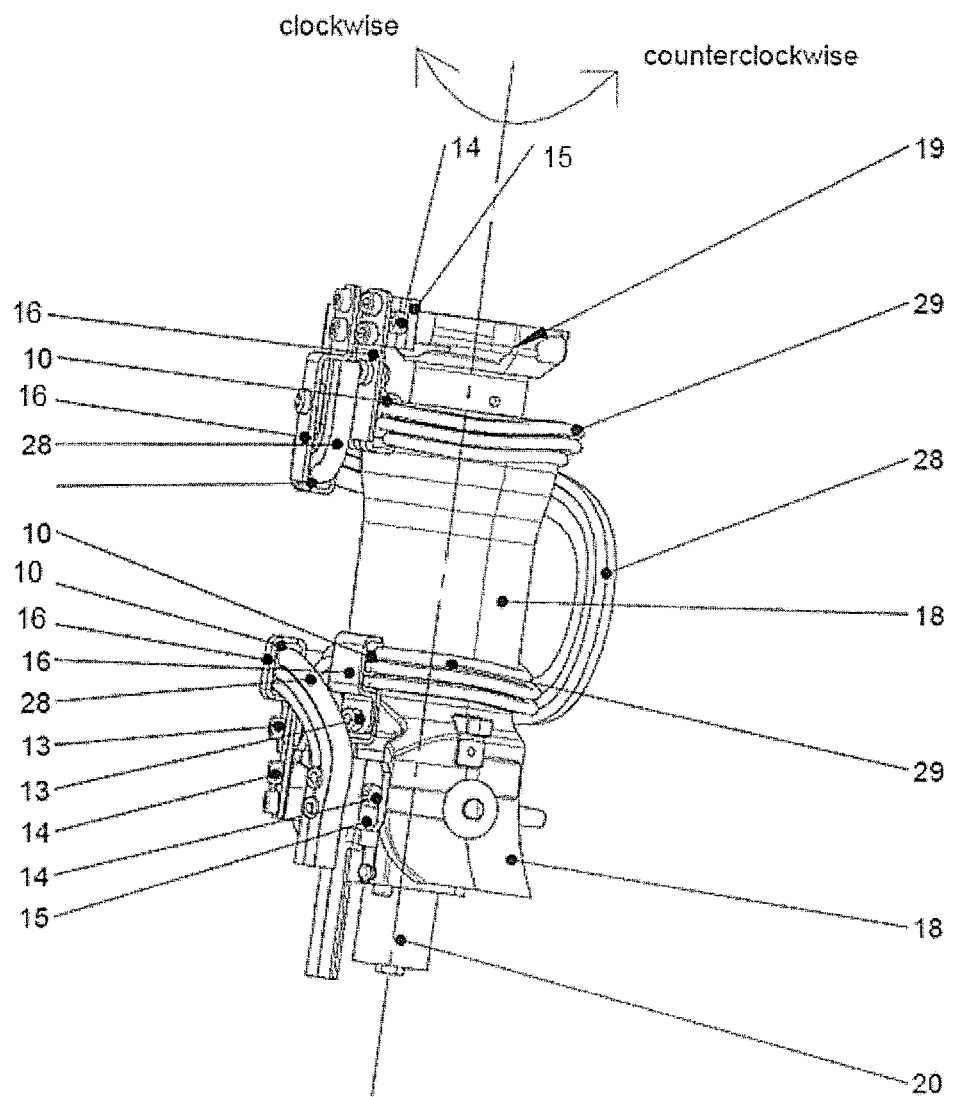
FIG. 3 shows a perspective view of the double-layer cable routine and fixing method according to an embodiment of the present disclosure.

With reference to FIGS. 2-3, a double-layer cable-management system may be used to pass cables through a rotary joint, to facilitate rotation from a first angular position to a second angular position without damage to the cables 28, 29. The joint is connected to an articulated arm, which includes two rotary shaft portions allowing the arm to rotate on the axis given thereto, namely, a first rotary shaft portion 18, and a second rotary shaft portion 19, which rotates relative to one another. A first rotary shaft portion 18 is fixed and a second rotary shaft portion 19 is rotatable.

In general, the cables 28, 29 are divided into the outer group of cables 28 and the inner group of cables 29.

As shown in FIG. 2, the system comprises a first cable guide 40 and a second cable guide 50, both has a circular tube-shape. The outer group of cables 28 is partly accommodated between the first cable guide 40 and the second cable guide 50. The inner group of cables 29 is partly accommodated between the second cable guide 50 and the first rotary shaft portion 18.

Another embodiment of the present application, as shown in FIG. 2, the first cable guide 40 can further comprises a first static guide 51 and a first moving guide 52. The first static guide 51, for example, two pieces of half circular-shaped plastic cover 1 as shown in FIG. 2, can be fixedly arranged along the first rotary shaft portion 18. The first moving guide 52, for example, two pieces of half circular-shaped plastic cover 2 as shown in FIG. 2, can be fixedly arranged along the second rotary shaft portion 19 so as to rotate together with the second rotary shaft portion 19.

Another embodiment of the present application, as shown in FIG. 2, the second cable guide 50 can further comprises a second static guide and a second moving guide. The second static guide, such as a half circular-shaped plastic cover 4 and a half circular-shaped plastic cover 5 in FIG. 2, is fixedly arranged along the first rotary shaft portion 18. The second moving guide, such as a half circular-shaped plastic cover band a half circular-shaped plastic cover 7, is fixedly arranged along the second rotary shaft portion 19 so as to rotate together with the second rotary shaft portion 19.

According to the present embodiment, inner layer is an approximate cylinder space for holding the cable group 29. Inner layer is formed by five parts, which are the plastic cover 6, the plastic cover 4, the plastic cover 7, the plastic cover 5 and the first rotary shaft portion, for example the casting base 53. Outer layer is also an approximate cylinder space for holding the other group 28. Outer layer is formed by eight parts, which are the plastic cover 6, the plastic cover 4, the plastic cover 7, the plastic cover 5, two pieces of plastic cover 2, and two pieces of plastic cover 1.

The working principle of the cable-management system of the present embodiment will be discussed below. All the parts, except the cable group 28 and the cable group 29, can be classified as two groups: static group and relative moving group.

Static group is composed by the motor 20, the casting base 18, the plastic cover 4, the plastic cover 5, two pieces of plastic cover 1. Relative moving group is composed by the gearbox 21, the output shaft 54, the plastic cover 6, the plastic cover 7, and two pieces of plastic cover 2.

Both cable group 28 and cable group 29 have one fixing point (static end) attached to the static group, and the other fixing point (moving end) are attached to relative moving group. When the motor 20 is running, the motion is transmitted to output shaft 19 through gearbox 21. If it rotates clockwise, the moving end of cable group 28 will push the cable group back moving in the outer layer, while the moving end of cable group 29 pulls the cable group back moving in the inner layer simultaneously. If it rotates counterclockwise, the moving end of cable group 28 will pull the cable group back moving in the outer layer, while the moving end of cable group 29 pushes the cable group back moving in the inner layer simultaneously.

As shown in FIG. 3, cables fixing method will be discussed below. The system further comprises at least four fixing members 60, which secure both ends of the outer group of cables 28 and the inner group of cables 29 on and along the first and second rotary shaft portions. The cables are arranged in parallel with each other, so that remaining portions of the outer group of cables 28 and the inner group of cables 29 are bent and suspended along the first and second rotary shaft portions in a U-shaped.

Figure 4:
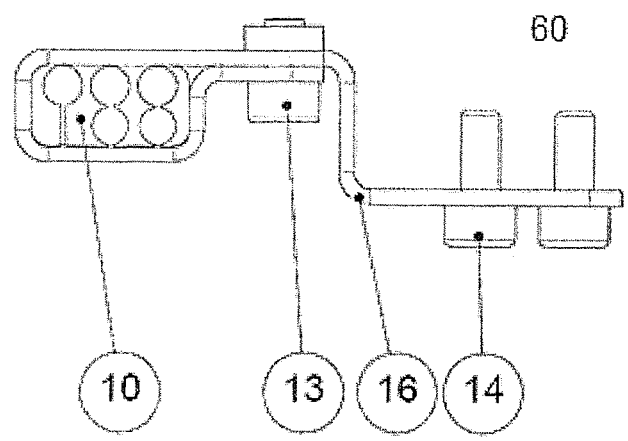
FIG. 4 shows a left view of the fixing member according to an embodiment of the present disclosure.

As shown in FIG. 4, the fixing member 60 can comprise a sheet metal part 16, which has two ends for holding the cables, an elastic part 10 for positioning the cables, for example, independent holes for each cable, and a plurality of screws 13, 14. Screw 13 is used to connect two ends of the sheet metal part 16, while screw 14 is used to connect the sheet metal part 16 to the rotary shaft portion.

Therefore, as described above, because the elastic part 10 has independent holes for each cable or air hose and each hole has a cutout for easy operation of cable assembly, so the cables can be well positioned.

The above describes one kind of fixing member, but its structure is not limited to the above, and it can also adopt, but not limited to, other structures as described below.

Figure 5:
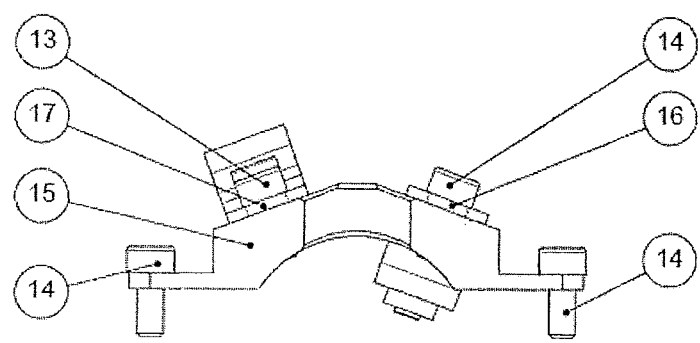
FIG. 5 shows a top view of the fixing member according to an embodiment of the present disclosure.

It should also be appreciated that the fixing member 60 can further comprise an adapter part 15, which has an inclined plane as shown in FIG. 5, for better adjusting the angle of the fixing member 60 according to the rotary shaft portion. In that case, as shown in FIGS. 5 and 6, as the adapter part 15 has already connected to the rotary shaft portion in a required angle through screw 14, the sheet metal part 16 does not need to connect to the rotary shaft portion directly, but firstly connect to the adapter part 15 through screws 14, then it can be indirectly connected to the rotary shaft portion.

Figure 6:
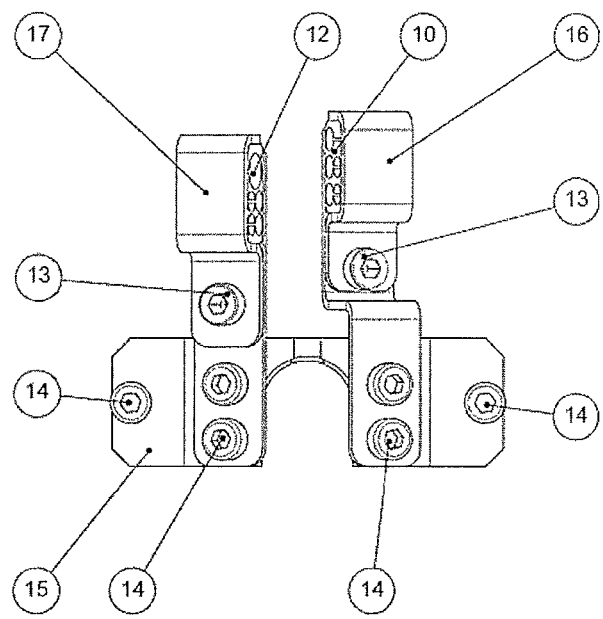
FIG. 6 shows a front view of the fixing member according to an embodiment of the present disclosure.

Another embodiment of the present application, as shown in FIGS. 5 and 6, to make the rotary joint more compact, one adapter part 15 can not only be formed to connect one sheet metal part 16, but can also be formed to connect to two or more sheet metal parts.

Another embodiment of the present application, to correspondingly set the elastic part 10 based on the layout requirement, in each cable group, the cable layout can be not only one layer, but also more layers, such as double-layer cable as shown in FIG. 4. For example, the outer group of cables 28 can be structured in one layer form or a multi-layer form by the elastic part 10. Or the inner group of cables 29 can also be structured in one layer form or a multi-layer form by the elastic part 10.

Furthermore, as the diameter of the cables could be the same or different, the elastic part 10 can also be formed based on the diameter of each cable, or the diameter of the air hose, for better positioning the cables and/or air hose, in the fixing member 60.

The above describes one kind of cable-management system, but the system structures are not limited to the above, and it can also adopt, but not limited to, other structures as described below.

For example, in another embodiment of the present application, each cable can have same diameter or different diameter.

It should also be appreciated that the cables 28, 29 are not necessarily restrictively used for electric wiring. The cables 28, 29 may include, for example, those which convey compressed air or those which suck air, liquid or materials for performing vacuum adsorption. For example, the outer group of cables 28 can be group of electric cables, or the combination of an air hose and a group of electric cables. Or the inner group of cables 29 can be group of electric cables, or the combination of an air hose and a group of electric cables.

Another embodiment of the present application will be further discussed below. Cable group 28, which is in the outer layer, has two fixing points. One fixing point is attached to output shaft 19, the other fixing point is attached to casting base 18. As shown in FIG. 5, the right fixing point attached to output shaft 19 is composed by the elastic part 10, the sheet metal part 16, the adapter part 15 and screws 13, 14. The left fixing point attached to casting base 18 is composed by the elastic part 12, the sheet metal part 17, the adapter part 15 and screws 13, 14. Cable group 29, which is in the inner layer, has also two fixing points. One fixing point is attached to output shaft 19, the other fixing point is attached to casting base 18. The fixing point attached to output shaft 19 is composed by the elastic part 10, the sheet metal part 16, the adapter part 15 and screws 13, 14. The other fixing point attached to casting base 18 is composed by the elastic part 12, the sheet metal part 17, the adapter part 15 and screws 13, 14.

Hereinafter, to make the skilled in the art to understand the solution as provided in the present disclosure completely and thoroughly, reference will be made to FIGS. 7 and 8 to explain how the double-layer cable layout can realize ±290 degrees as provided in embodiments of the present disclosure.

Figure 7:
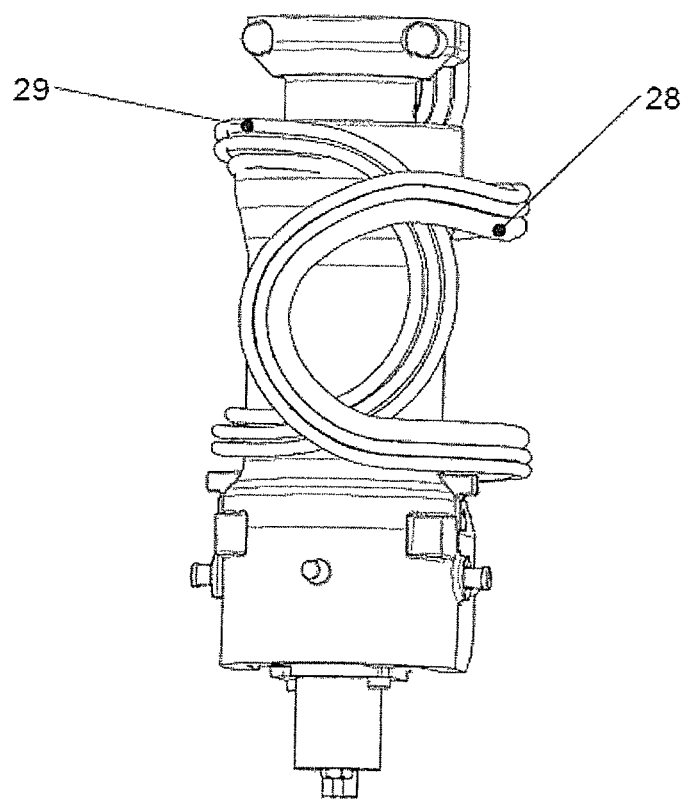
FIG. 7 illustrates the double-layer cables layout with a rotary shaft according to an embodiment of the present disclosure.

FIG. 7 shows the double-layer cables layout with a rotary shaft.

Figure 8:
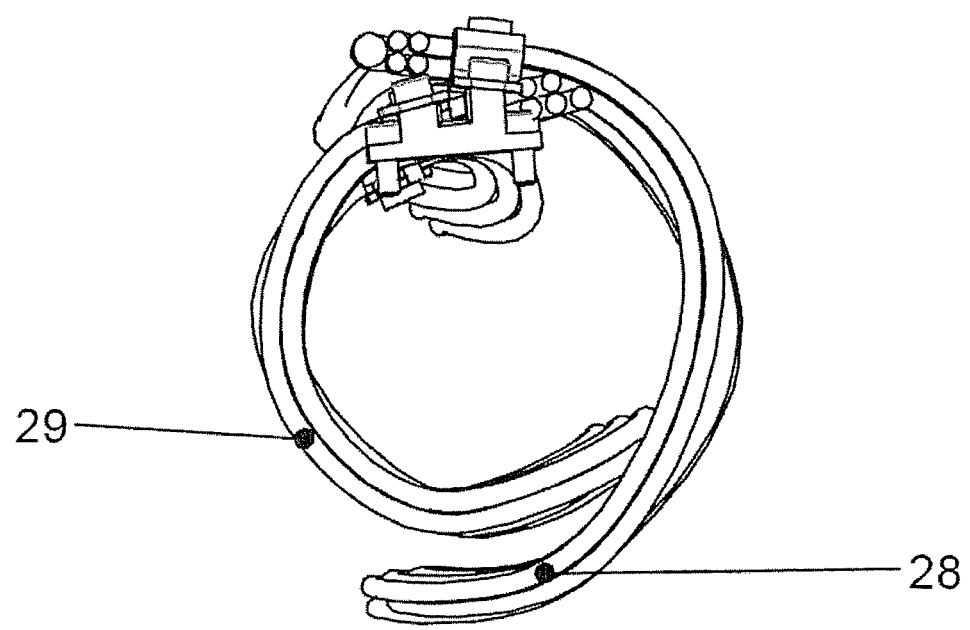
FIG. 8 illustrates a top view of the double-layer cable layout according to an embodiment of the present disclosure.
Figure 9:
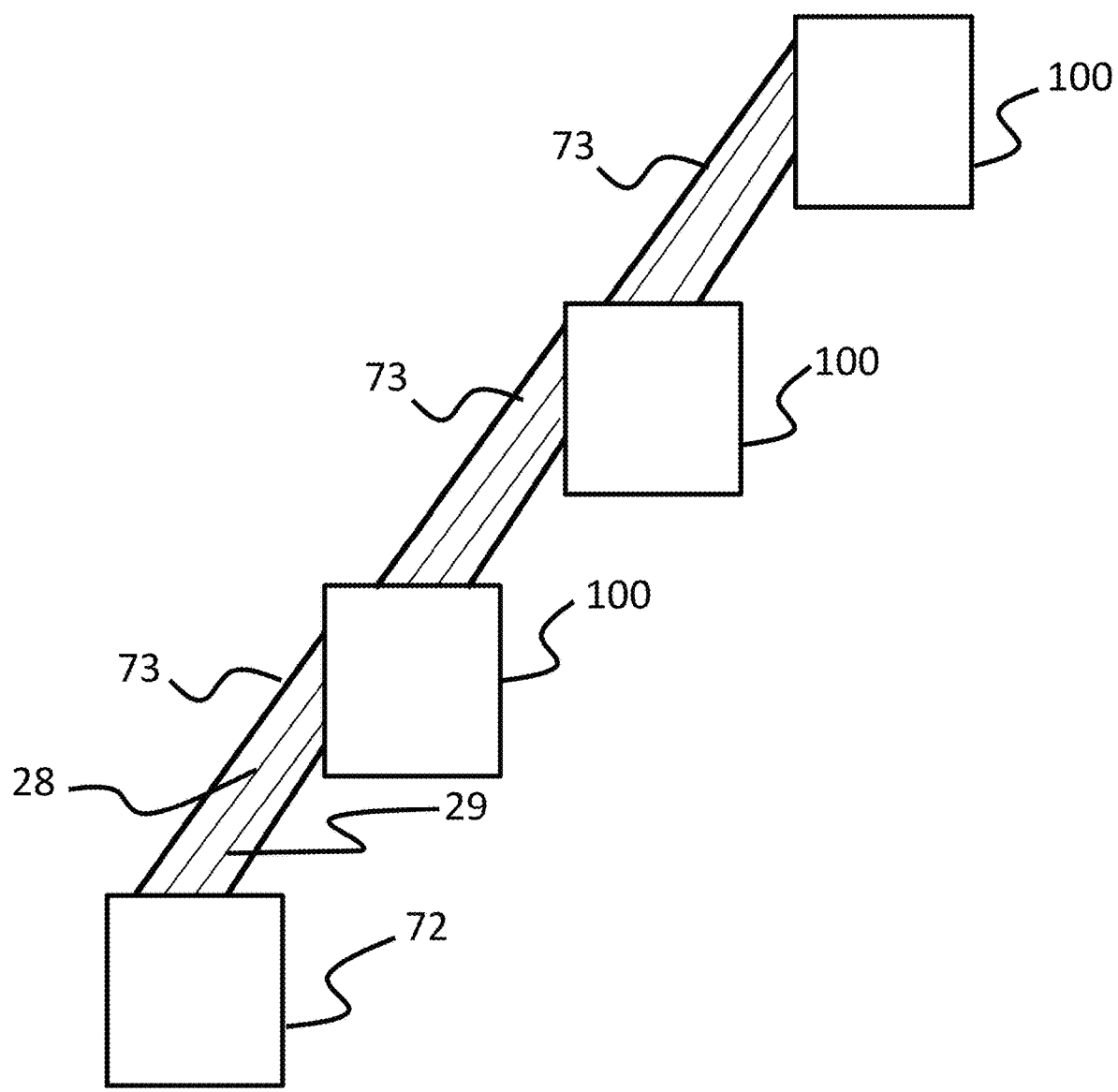
FIG. 9 illustrates a schematic view of a controller, arms, motors, and cables according to an embodiment of the present disclosure.

FIG. 8 shows a top view of the double-layer cable layout.

Generally, the working range of rotatory shaft depends on the length of the cable. The longer the cable length, the bigger the working ranges. If two groups of cable are used and they are moving in a single-layer, the maximum length can be obtained when two groups of cables start to contact. If longer cables are used, the two groups of cables will overlap each other or interfere with each other when the shaft rotates. However if two groups of cables are located in different space, shown as FIGS. 7 and 8, the overlapping will not produce interference between two groups of cables, because they will not contact each other at all. That means the length of both cable groups can be much more than the maximum length when they are located in the same layer. So the working range of double-layer can be much larger than single-layer, and even up to ±290 degrees.

Figure 10:
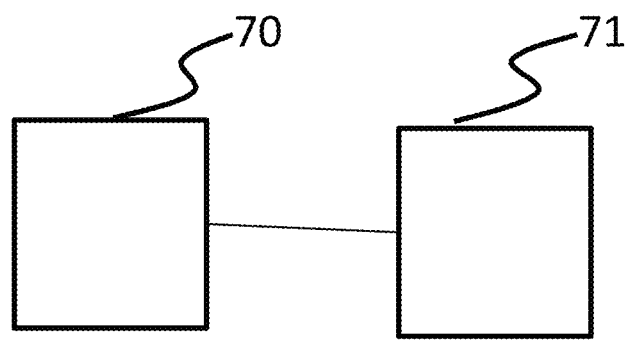
FIG. 10 illustrates a schematic view of robot and rotary joint according to an embodiment of the present disclosure.

Therefore, as described above, by having double-layer cable layout and fixing members, a new cable management system can be designed to facilitate compactness and reliability of rotary joint 70 of a robot 71 (also as depicted in FIG. 10). It generally proposes a new kind of cable harness layout solution, which is double-layer cable harness layout, for rotary shaft of robot and other machinery.

Furthermore, it expands the working range of a rotary shaft with cable harness from within ±170 degrees to over ±170 degrees, even up to ±290 degrees. And cables and air hose can be fixed by a combination of elastic holder and brackets.

Hereinabove, embodiments of the present disclosure have been described in details through embodiments with reference to the accompanying drawings. It should be appreciated that, while this specification contains many specific implementation details, these details should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

The invention claimed is:

1. A cable-management system that holds a plurality of cables arranged in a rotary joint connected to an articulated arm having a rotary shaft which allows the arm to rotate on an axis given thereto, the rotary shaft being divided into two shafts, a first of which is fixed and a second of which is rotatable, the second shaft having an integral construction forming a unitary component, the system facilitating rotation from a first angular position to a second angular position without damage to the cables, the cables are divided into an outer group of cables and an inner group of cables, the system comprises:

a first cable guide, a second cable guide and at least four fixing members;

the first cable guide has a circular tube-shaped space, and the outer group of cables is partly accommodated between the first cable guide and the second cable guide;

the second cable guide has a circular tube-shaped space, and the inner group of cables is partly accommodated between the second cable guide and the first rotary shaft; and the fixing members respectively secure both ends of the outer group of cables or the inner group of cables on and along the first rotary shaft and the second rotary shaft in a form in which the cables are arranged in parallel with each other, so that remaining portions of the outer group of cables or the inner group of cables are bent and suspended along the first and second rotary shafts in a U-shape;

wherein the entirety of the integral construction forming the unitary component second rotary shaft is located radially inward of an outermost portion of the first cable guide;

wherein the inner group of cables forms a first U-shape and the outer group of cables forms a second U-shape, the first and second U-shapes facing in opposite directions, and the first and second U-shapes overlapping each other such that the first U-shape of the inner group of cables is inside the second U-shape of the outer group of cables.

2. The cable-management system according to claim 1, wherein a range of clockwise and counterclockwise rotation of the second rotary shaft is ±290 degrees.

3. The cable-management system according to claim 1, wherein the first cable guide comprises a first static guide and a first moving guide, the first static guide is fixedly arranged along the first rotary shaft, and the first moving guide is fixedly arranged along the second rotary shaft so as to rotate together with the second rotary shaft.

4. The cable-management system according to claim 3, wherein the first static guide is structured by two pieces of half circular-shaped plastic cover, and the first moving guide is structured by two pieces of half circular-shaped plastic cover.

5. The cable-management system according to claim 1, wherein the second cable guide comprises a second static guide and a second moving guide, the second static guide is fixedly arranged along the first rotary shaft, and the second moving guide is fixedly arranged along the second rotary shaft so as to rotate together with the second rotary shaft.

6. The cable-management system according to claim 5, wherein the second static guide is structured by a first half circular-shaped plastic cover and a second half circular-shaped plastic cover, and the second moving guide is structured by a first half circular-shaped plastic cover and a second half circular-shaped plastic cover.

7. The cable-management system according to claim 1, wherein the fixing members comprise a sheet metal part which has two ends for holding the cables, an elastic part for positioning the cables, and a plurality of screws which are configured to connect two ends of the sheet metal part and connect the sheet metal part to the rotary shaft, respectively.

8. The cable-management system according to claim 7, wherein the fixing members further comprise an adapter part for adjusting an angle of the fixing member according to the rotary shaft.

9. The cable-management system according to claim 8, wherein the screws used to connect the sheet metal part to the rotary shaft are structured to first connect the sheet metal part to the adapter part, then connect the adapter part to the rotary shaft.

10. The cable-management system according to claim 8, wherein one adapter part is formed to connect one or several sheet metal parts.

11. The cable-management system according to claim 7, wherein the elastic part has independent holes for each cable.

12. The cable-management system according to claim 1, wherein a diameter of the cables is the same or different.

13. The cable-management system according to claim 1, wherein the outer group of cables or the inner group of cables are structured in a one layer form or a multi-layer form.

14. The cable-management system according to claim 1, wherein the outer group of cables or the inner group of cables are a group of cables, or a combination of an air hose and a group of cables.

15. A robot comprising the rotary joint according to claim 1.

16. The robot according to claim 15, wherein the robot has a controller and a plurality of articulated arms respectively provided with electric motors to drive the arms, the cables electrically connecting the controller and the motors.

* * * * *